United States Patent [19]

Velte

[11] 4,446,620

[45] May 8, 1984

[54] TUBE CUTTER, ESPECIALLY FOR PLASTIC TUBES

[75] Inventor: Karl-Heinz Velte, Weilrod, Fed. Rep. of Germany

[73] Assignee: Rothenberger GmbH & Co. Werkzeuge-Maschinen KG, Fed. Rep. of Germany

[21] Appl. No.: 406,619

[22] Filed: Aug. 9, 1982

[30] Foreign Application Priority Data

Sep. 14, 1981 [DE] Fed. Rep. of Germany ....... 3136406

[51] Int. Cl.³ ...................... B23D 21/10; B29C 17/10
[52] U.S. Cl. ............................................ 30/96; 30/92
[58] Field of Search ................. 30/96, 97, 98, 99, 101, 30/92, 94, 90.7

[56] References Cited

U.S. PATENT DOCUMENTS

| | | | |
|---|---|---|---|
| 1,215,120 | 2/1917 | Cramer | 30/94 |
| 3,456,856 | 7/1969 | Berberian | 30/92 X |
| 3,798,765 | 3/1974 | Mattsson | 30/96 |
| 3,946,487 | 3/1976 | Bieganski | 30/90.7 |
| 4,063,355 | 12/1977 | Netzel | 30/96 |

FOREIGN PATENT DOCUMENTS 2053274 5/1972 Fed. Rep. of Germany .......... 30/96

*Primary Examiner*—Jimmy C. Peters
*Attorney, Agent, or Firm*—Felfe & Lynch

[57] ABSTRACT

The invention relates to a tube cutter, especially for plastic tubes, which comprises a housing that can surround the tube and having a rotation guide gripping the tube. The tube cutter has a cutting tool which can be sunk into the outer surface of the tube, having a lengthwise guide and a tool holder movable therein. The cutting tool has a cutting edge which runs at an angle to the direction of movement of the tool holder and lies substantially in a plane passing through the rotational axis. By these means it is possible to produce bevels with the cutting edge. To solve the problem of shaping the bevels on the tube periphery as uniformly wide as possible even with non-circular tube cross-sections, and to avoid an irregular force requirement at the end of the separating operation, it is proposed according to the invention to arrange a resilient member between the tool holder and the spindle and to provide the tool holder with a spacing guide device for guiding the cutting tool relatively to the outer surface of the tube.

8 Claims, 5 Drawing Figures

TUBE CUTTER, ESPECIALLY FOR PLASTIC TUBES

BACKGROUND TO THE INVENTION

The invention relates to tube cutters, especially for plastic tubes, adapted to cut and bevel tubes.

Such a tube cutter is for example known from West German Gebruachsmuster 78 11 885. In this, arrangements are made to carry out the cutting operation by changing the position of the tool holder, which can be guided to give either a flat, radial cut face or a conical cut face. The latter is also frequently called a "bevel".

The known tube cutter has proved best however where the outer face of the tube to be cut is as close as possible to a mathematically exact cylinder. It is found in commercially available plastic tubes, however, that there are departures from the circular and/or in diameter. When a tube with a diameter too large by one or a few millimeters is stressed, the cross section inside the tool deforms to an oval, so that ultimately, in either case, a tube has to be cut of which the outer face departs more or less from an exact cylinder.

If one effects a severing cut with a bevel with the known tool, the lines between the conical surface (=bevel) and the end face formed by the cut on the one hand and the outer face on the other hand is wave-shaped, the bevel being most pronounced where the radius, from the nominal axis of the tube, is greatest. The user has, in consequence, the impression that the tool is not working properly. Furthermore, it is desired that bevels are as even as possible so that the bevelled part of the tube can be inserted into a coupling or the like with a sealing ring. Finally, however, the cutting process itself leads to difficulties because the residual section remaining at the end of the cutting process is irregular, so that the cutting tool at one position penetrates the inner face of the tube, while at another position it is still inside the material. The actuating forces required for a rotation of the known tool are as a result irregular; in thin-walled and/or brittle tubing, either the tool gets stuck or it does not generally make a clean cut.

It is an object of the invention to improve the above described tube cutter, so that it makes possible, even with tubes of which the outer surface departs from an exact cylinder, a simpler operation as well as a cleaner cut and especially a cleaner bevel.

BRIEF DESCRIPTION OF THE INVENTION

According to the invention, the tool holder is resiliently urged towards the outer surface of the tube, and has a stop or spacing-guiding device for guiding the cutting tool relative to the outer surface of the tube.

Through the resilient member, the inflexible coupling provided in the prior art between tool holder and spindle is eliminated. In this way, the position of the cutting tool is no longer in all circumstances proportional to the spindle position, which is only an advantage for exactly cylindrical tubes. Moreover, the cutting tool can be displaced relative to the spindle by an amount determined by the nature of a resilient member that urges the tool holder towards the surface. The resilient member is usefully formed with a particular pre-loading and should not be made too soft. Correct dimensioning can be easily found through trials.

By means of the stop or guide device, which, in the embodiment further described below, only comes into effect after the cutting operation has already begun, it is provided that, in the last phase of the cutting operation, but particularly when making the bevel, the outer surface of the tube itself is used to guide the cutting tool. As a result of this—by virtue of corresponding deformation of the resilient member—the tool holder, or the cutting tool, follows precisely all variations in the radius of the tube.

Since the guide device is made preferably adjustable relative to the cutting tool, it can as desired—presupposing a suitable construction of the cutting tool—produce both a flat separating cut and also one with a bevel. Penetration of the tool through the inner surface of the tube occurs uniformly over the whole periphery. The bevels so formed (conical face) have edges of absolutely uniform length, so that the appearance and function of the cut end of the tube conform to the stated requirements. In particular, when using the cutting or bevelling method, the required force no longer varies, so that the user also has the feeling that the tool carries out the cutting operation without a hitch up to the end. Tearing of the material at the cutting position, or even splitting of brittle tube material, is no longer experienced.

It is immaterial that, at the beginning of the operation, the cutting tool is not yet guided by the stop or guide device. At small penetration depth, and also at completion of the bevelling, variable actuating forces are not so important. Further penetration of the cutting tool, or its cutting edges, which produces the bevelling, ceases however at any position of the tube circumference when the final penetration depth into the tube wall which has been predetermined by adjustment of the guide device is reached at all points of the circumference.

In this regard it is particularly advantageous if, according to a further invention, the resilient member is a compression spring, when the tool holder has a lengthwise bore in which are arranged the compression spring and a movable sleeve, movable against the spring, and when the spindle engages in the sleeve.

In this way, the resilient member is integrated into the tool holder, so that in the known apparatus, no further modification is required to be carried out than a simple exchange of the tool holder with the cutting tool, since the outer dimensions of the tool holder can be maintained.

It is, however, also basically possible to support the spindle in a special spindle mounting which is resiliently spaced away from the housing.

In the previously described case it is particularly advantageous if the guide device comprises a spacing pin which is arranged in the end face of the tool holder next to the cutting tool, and if the end face of the distance pin can be brought into contact with the outer surface of the tube. The spacing pin is in this way contained within the cross-section of the tool holder.

As already explained further above, the guide device is preferably made adjustable so that the position of the guide in relation to the final position of the separating cut, or the bevelling, can be finely adjusted. This is done in particularly simple manner by making the spacing pin a threaded pin screwed into the tool holder.

It is to be understood that measures should be taken so that the guide device or the threaded pin cannot make any undesired adjustment. To this end, either the thread is made very stiff or it is made possible to fix the guide device in position by a clamping arrangement or a laterally inserted grub screw.

BRIEF DESCRIPTION OF THE DRAWINGS

Further advantageous features of the subject matter of the invention are evident from the remaining subsidiary claims. One embodiment of the invention and its components are hereinafter described with reference to FIGS. 1-5.

These show.

DETAILED DESCRIPTION OF THE PREFERRED EMBODIMENT

Figure 1:
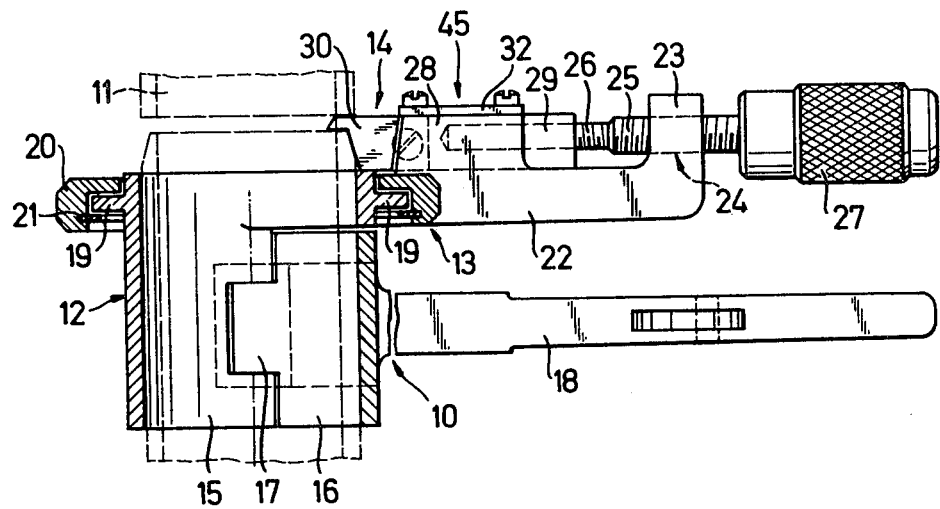
FIG. 1 a partial section through a complete tube cutter in the direction of the tube axis, and also a partial side view.
Figure 2:
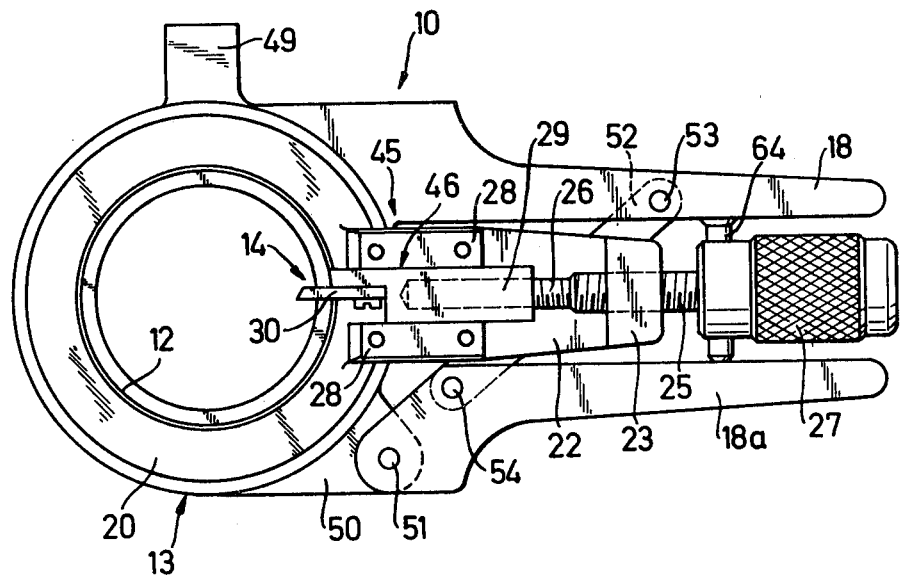
FIG. 2 a plan view of the cutter of FIG. 1.

In FIGS. 1 and 2 is shown a tube cutter 10 for cutting a tube 11. It comprises a guide 12 for rotation which can be placed around the tube 11 and a housing 13 with a cutting device 14 rotatable thereabout. The guide 12 has two annular half-shells 15 and 16, which are pivotally connected together by a first hinge 17. The hinge 17 is shown in FIG. 1 displaced by 90°.

The half shells 15 and 16 are pressed together with the aid of two handles 18 and 18a. The handle 18 is fixed to the half shell 15, which has at its upper end in FIG. 1 a peripheral, that is to say, a continuous, guide ring 19.

On the half shell 16 movable with respect to the guide ring 19—a gap is arranged diametrically opposite the first hinge 17—a tongue 50 is formed on which the handle 18a is pivotally fastened by a second hinge 51. Between the handles 18 and 18a is a pressure rod 52, which is fastened to the handles by third and fourth hinges 53 and 54. The pressure rod 52 and the handle 18a form, by the hinges 51, 53 and 54, a toggle system which locks in the compressed position shown in FIG. 2 and presses the two half shells 15 and 16 releasably together and thus grips the tube 11.

On the continuous guide ring 19 a ring 20 is rotatably slidable, which forms a part of the housing 13. A locking ring 21 is provided to hold together the guide ring 19 and the ring 20.

The housing 13 further comprises a projection 22 arranged radially on the ring 20, which at its free end carries an angle piece 23 with an internal thread for a spindle 25. The spindle 25 has a further spindle 26 projecting from it which has a smaller thread diameter.

The threads of the spindles 25 and 26 are of opposite hand. At the other end of the spindle 25 is a hand grip 27.

On the radial projection 22 there are two guide members 28 on the same side as the angle piece 23, which enclose between them a recess 46 which forms a part of a radial lengthwise guide track 45 for a tool holder 29 provided with a cutting tool 30. The tool holder 29 is held between the guide members 28 by a closure plate 32, which for clarity's sake is removed in FIG. 2. A rectangular form projection 49, which is formed on the half shell 15 which is fixed to the handle 18, serves to load the complete unit in a supporting apparatus, for example a vice. A spacing lock 64 ensures that the hand grips 18 and 18a cannot be further pressed together, as shown in FIG. 2.

Figure 5:
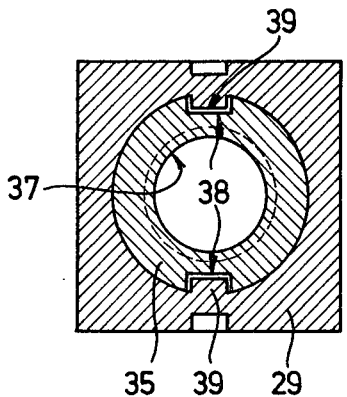
FIG. 5 a cross-section through the cutter of FIG. 3 along the line V—V to a further enlarged scale.
Figure 3:
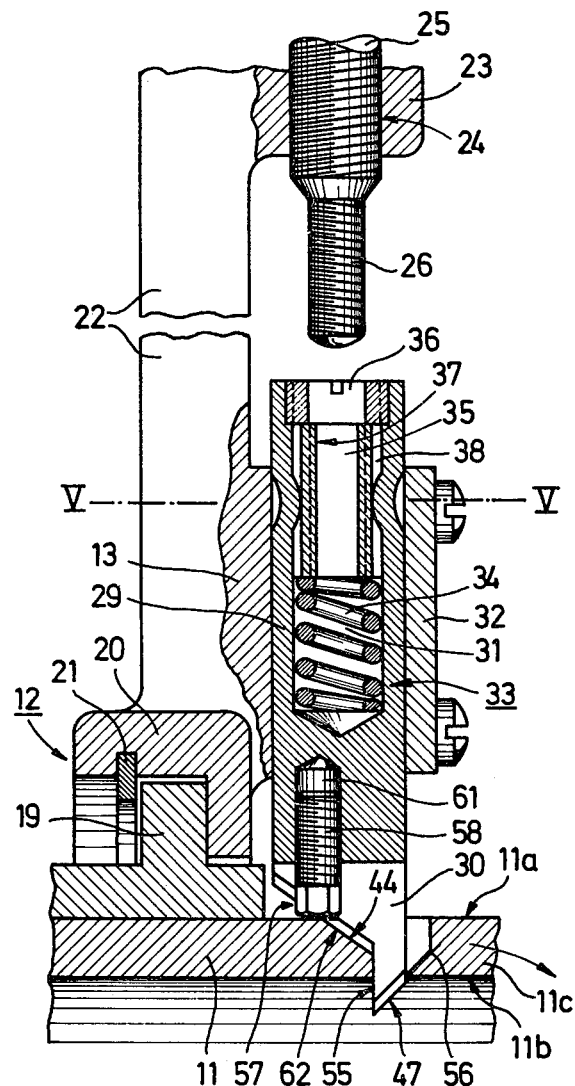
FIG. 3 a radial section through the rotational axis of the tool and through the tool holder to a larger scale.
Figure 4:
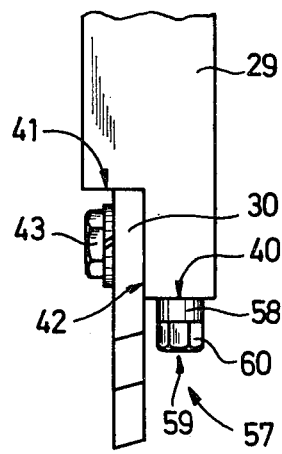
FIG. 4 a plan view of the tool holder with cutting tool and guide device.

In FIGS. 3 to 5 like parts are shown with like reference numerals. Additionally it is to be recognised as follows:

The tool holder 29 has a lengthwise bore 31, which has a common axis with the spindles 25 and 26. The lengthwise bore 31 is directed with its open end towards the spindle 26 and receives a resilient member 33, which is formed as compression spring 34. The spring abuts at one end on the bottom of the lengthwise bore 31, while its other end presses against a sliding sleeve 35, which—as its name suggests—is guided with a sliding fit in the lengthwise bore 31. It is prevented from slipping out by an annular retainer 36. The sliding sleeve 35 is provided with an internal thread 37, which is complementary to the thread of the spindle 26. The spindle 26 is, for clarity's sake, shown screwed out of the sliding sleeve 35; in operation however it is inserted into the sleeve as shown in FIGS. 1 and 2. In the position of FIG. 3, however, it allows the tool holder 29 to be exchanged for another or to be moved to a different position.

The tool holder 29 has a rectangular section and is, as a result, not rotatable in the guide members 28. In order to prevent, additionally, the sliding sleeve 35 rotating with respect to the tool holder 29, the sleeve is provided with diametrically opposed lengthwise grooves 38, in which ribs 39 engage, which are part of the tool holder 29. (See especially FIG. 5). The ribs can most easily be fashioned by a local punching operation, as is apparent from FIGS. 3 and 5.

As shown in FIG. 4, the tool holder 29 is provided in the region of its forward end face 40 with a recess, by which are formed a shoulder 41 and a mounting face 42 for the cutting tool 30. This comprises a suitably shaped cutting plate which is held in the recess by a screw 43.

The cutting tool 30 has a cutting edge 44 which runs at an angle of about 60° to the direction of movement of the tool holder 29 (radially to the axis of rotation) and lies substantially in a plane passing through the axis of rotation. The cutting tool 30 has a further cutting edge 47 which lies in the same plane as the edge 44 but runs at right angles to it and lies at a substantially further forward position. The cutting edge 47 extends between two roughly parallel planes 55 and 56, where the expression "parallel" includes such displacement as is usual in cutting tools.

In the end face 40 is arranged a spacing guide device or stop 57, which comprises a spacing pin 58 with an end face 59 and a hexagonal head 60. The spacing pin is threaded over at least part of its length and carried in a correspondingly threaded bore 61 of the tool holder 29 so as to be axially adjustable.

The method of operation of the apparatus above described is as follows, in which it is assumed that the spindle 26 is engaged in the sleeve 35 of FIG. 3.

First the tool holder 29 is located with its cutting edge 47 over the outer surface 11a of the tube.

This is now loaded by means of the spindles 25 and 26 against the surface 11a and then the housing 13 is closed by pivoting behind the plane of the drawing of FIG. 3, so that the cutting edge 47 cuts into the surface 11a of the tube by carrying out the rotary movement and sufficiently further rotating the spindles 25 and 26, so that first a V-shaped groove will be formed. After the tip of the cutting edge 47 has penetrated the inner surface 11b of the tube, the part 11c of the tube 11 lying to the right in FIG. 3 is separated, in which there will remain a burr corresponding to the position of the cut edge 47. This is no problem as the cut end of the part 11c must in any event be reworked. The part of the tube we are concerned with here is the shortened tube 11.

By further operation of the spindles 25/26 the cutting tool 30 is finally moved so far radially of the tube 11 that the position shown in FIG. 3 is reached. (The part 11c is now not there any more.) Here, a bevel 62 in the form of a conical surface, which on the one hand is bordered by the outer face 11a of the tube and on the other hand by the plane end face of the tube 11, whose position corresponds to the position of the surface 55, is formed by means of the more rearwardly situated bevel cutting edge 44. It could be that the bevel 62 is at first not equally wide over the entire periphery. Since, however, at the end face 59 of the spacing guide device 57 first comes, at least with adjustment, to lie on the uncut surface 11a of the tube adjacent the bevel cut by the bevel cutting edge 44 at this point, the cutting edges do not penetrate further into the tube. At the position referred to, therefore, no more material will be removed. So far as concerns the bevel at other positions, where it runs more shallowly, the end face 59 does not lie against the tube surface, so that the cutting tool 30 can still be moved further radially inwards under the influence of the compression spring 34, until the spacing guide device 57 comes into contact with the tube surface 11a equally all around the circumference. At this moment, a bevel 62 of substantially uniform width has been made over the entire circumference.

It will be evident that the spacing pin 58 can also be screwed out further from the tool holder 29 so that for example the tip of the cutting edge 47 penetrates just level with the inner face 11b of the tube. Since in this case also the tool holder 29 abuts against the outer surface 11a of the tube, it prevents the cutting edge 47 penetrating too deeply into the hollow interior of the tube. This penetration is also seen in the prior art, since the tool as a whole, even though not having a resilient member, has a certain, though small, resilience. The resulting necessary tearing or wringing off required for the remaining cross-section is effectively avoided by the invention.

It will be further understood that the spacing pin 58 can also be brought into desired intermediate positions according to how pronounced a bevel is desired.

What we claim is:

1. A tube cutter, comprising: a guide adapted to grip a tube to be cut and a cutting tool holder rotatable on the guide about the axis of a tube so gripped and adapted to hold a cutting tool with a separate beveling edge, the tool holder being resiliently urged towards the outer surface of the tube and having a stop to run only on an uncut portion of the outer surface adjacent the bevel cut therein by the separate bevelling edge of the cutting tool for limiting its movement theretowards.

2. A tube cutter, especially for plastic tubes, comprising: a guide which fits about the tube, with a rotational guide ring thereon, a cutting tool holder rotatable around and adjustable on the guide ring in the radial direction with respect to the axis of rotation by means of a spindle and a lengthwise guide, the lengthwise guide comprising a recess arranged radially in the holder, a cutting tool displaceable in the recess and having a cutting edge and a separate bevel-cutting edge which runs at an angle of less than 90° and more than 0° to the direction of rotatable movement of the tool holder and lies substantially in a plane through the axis of rotation in such manner that bevels can be produced with the bevel-cutting edge in the cut edge of the tube, a resilient member between the tool holder and spindle, and a guide device on the tool holder for guiding the cutting tool relative only to the uncut outer surface of the tube adjacent the bevel cut therein.

3. A tube cutter according to claim 2, in which the resilient member is a compression spring, the tool holder has a longitudinal bore, in which bore the compression spring and a sleeve displaceable against the compression spring are arranged, and the spindle engages in the displaceable sleeve.

4. A tube cutter according to claim 3, in which the displaceable sleeve has an internal thread in which a complementary thread of the spindle engages.

5. A tube cutter according to claim 3, in which the displaceable sleeve has at least one lengthwise groove on its outer face, in which is engaged a projection from the tool holder.

6. A tube cutter according to claim 2, in which the spacing guide device comprises a spacing pin, which is arranged in the end face of the tool holder beside the cutting tool and of which the end face can be brought into contact with the outer surface of the tube.

7. A tube cutter according to claim 6, in which the spacing pin is a threaded pin screwed into the tool holder.

8. A tube cutter according to claim 2, in which the cutting edge runs on an angle of from 30 to 60 degrees, preferably 45 degrees to the direction of movement of the tool holder.

* * * * *